(12) United States Patent
Seligmann

(10) Patent No.: US 7,539,486 B2
(45) Date of Patent: May 26, 2009

(54) WIRELESS TELECONFERENCING SYSTEM

(75) Inventor: Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1093 days.

(21) Appl. No.: 10/672,319

(22) Filed: Sep. 26, 2003

(65) Prior Publication Data

US 2004/0116130 A1 Jun. 17, 2004

Related U.S. Application Data

(63) Continuation-in-part of application No. PCT/US03/14120, filed on May 6, 2003.

(60) Provisional application No. 60/378,193, filed on May 6, 2002.

(51) Int. Cl.
H04M 3/42 (2006.01)

(52) U.S. Cl. .................. 455/416; 455/41.2; 379/202.01

(58) Field of Classification Search ................ 455/41.2, 455/41.3, 414.1, 416, 456.1; 370/368; 379/202.01
See application file for complete search history.

(56) References Cited

U.S. PATENT DOCUMENTS

| 4,184,048 | A | 1/1980 | Alcaide |
| 5,533,112 | A | 7/1996 | Daneels |
| 6,178,237 | B1 | 1/2001 | Horn |
| 6,501,739 | B1 | 12/2002 | Cohen |
| 7,006,616 | B1 * | 2/2006 | Christofferson et al. ............. 379/202.01 |
| 2002/0181686 | A1 | 12/2002 | Howard et al. |
| 2003/0044654 | A1 * | 3/2003 | Holt ......................... 429/13 |

FOREIGN PATENT DOCUMENTS

| WO | WO 00/72560 A1 | 11/2000 |
| WO | WO 03/094383 A1 | 11/2003 |

OTHER PUBLICATIONS

M. Gravelle, "CA Application No. 2,482,273 Office Action", Apr. 18, 2008, Publisher: Canadian Intellectual Property Office, Published in: CA.

* cited by examiner

*Primary Examiner*—Quochien B Vuong
(74) *Attorney, Agent, or Firm*—DeMont & Breyer LLC

(57) ABSTRACT

A technique for improving the effectiveness of conference calls is disclosed. The present invention is a teleconferencing system that is based upon wireless technology. Access points, one or more per conference area, distribute the audio to and from each participant in the conference area. Wireless terminals are used by the participants to receive audio from other participants that are not collocated and to transmit audio to other participants that are not collocated. The teleconferencing system tracks which participants are collocated with each other versus not collocated with each other and transmits a composite audio signal to each participant.

17 Claims, 7 Drawing Sheets

US 7,539,486 B2

WIRELESS TELECONFERENCING SYSTEM

CROSS-REFERENCE TO RELATED APPLICATIONS

This application is a continuation-in-part of:
1. PCT Patent Application Ser. No. PCT/US03/14120, filed on 6 May 2003, entitled "Wireless Conferencing System" and to be published in English, now pending, and
2. U.S. Provisional Patent Application Ser. No. 60/378,193, filed on 6 May 2002, entitled "Bluetooth Conference Room Phone System: Bluetooth Headsets Replace the Meeting Room Speakerphone," now pending, both of which are also incorporated by reference.

FIELD OF THE INVENTION

The present invention relates to telecommunications in general and, more particularly, to a wireless teleconferencing system.

BACKGROUND OF THE INVENTION

A conference call is a commonplace tool of business. Typically, a conference call involves three or more people exchanging ideas with each other by telephone at two or more locations. Sometimes, the number of participants in a conference call is small and all of the participants can follow the conversation. Those participants of a conference call that are at the same location as a speaker can readily observe the nonverbal cues of the speaker in addition to the speaker's verbal cues. The participants of the conference call that are at a different location than the speaker cannot observe the speaker's nonverbal cues.

Indeed, a conference call can exhibit one or more of the following problems or disadvantages:
Difficulty in hearing non-collocated participants,
Difficulty on the part of remote participants or participants in one conference room to hear participants in another conference room,
Ambient noises (e.g., fan noise, rustling of papers, etc.) and echoes that cause further interference,
Audio from different, non-collocated participants being received at different volumes,
Phone numbers and other relevant information having to be entered by hand,
The need to physically manipulate the speakerphone to make adjustments,
Reliance on a paper record for a "complete" list of participants, and
Difficulty of identifying the participant who is speaking at any given moment by non-collocated participants.

These problems can diminish the effectiveness of a conference call.

SUMMARY OF THE INVENTION

The present invention enables a teleconferencing system that tracks which conference call participants are collocated with each other versus not collocated with each other. At least some of the participants receive an audio signal of the conference call through a wireless headset. By tracking the participants, the system transmits to the wireless headset of each specific participant the composite audio signal that represents the audio from those participants who are not collocated with the specific participant. In some embodiments, the teleconferencing system omits the audio signals of the collocated participants, so as not to interfere with the direct audio path of sound waves from mouth to ear.

The teleconferencing system, in some embodiments, also creates subconferences, sidebars, and whispering effects. Furthermore, the teleconferencing system, in other embodiments, bridges in audio messages to specific participants during the course of a call. By managing the collective distractions of the overall group of participants, the teleconferencing system of the present invention can improve the effectiveness of conference calls.

An illustrative embodiment of the present invention comprises: receiving a first series of frames that represents a first audio signal from a first source; receiving a second series of frames that represents a second audio signal from a second source; forming a third series of frames that represents a composite signal comprising at least one of the first audio signal and the second audio signal, wherein the composite signal is based on the location of the first source relative to the location of the second source; and transmitting the third series of frames.

DETAILED DESCRIPTION

Figure 1:
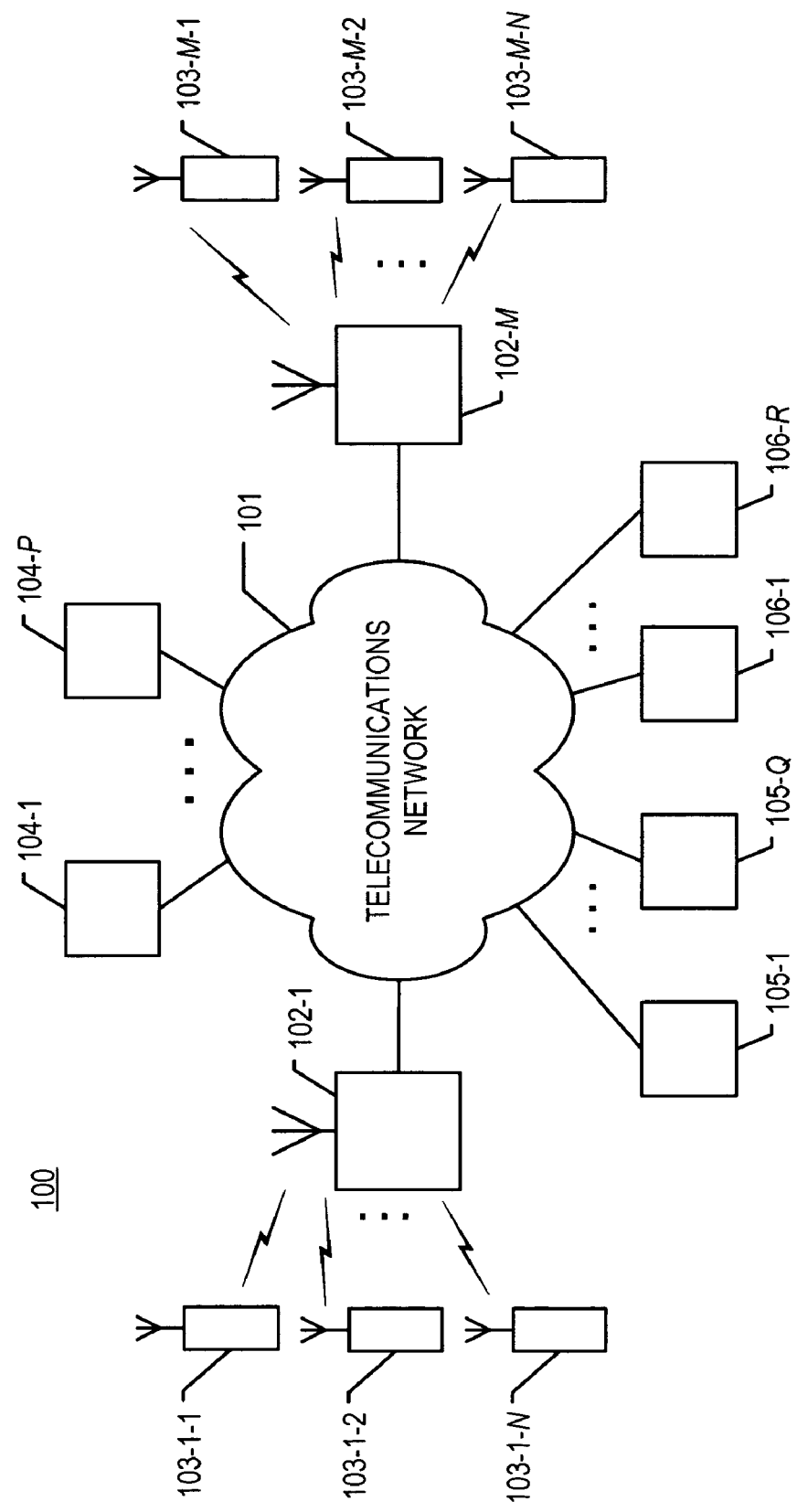
FIG. 1 depicts teleconferencing system 100 in accordance with the illustrative embodiment of the present invention.

FIG. 1 depicts a schematic diagram of teleconferencing system 100, in accordance with the illustrative embodiment of the present invention. Teleconferencing system 100 comprises telecommunications network 101, access points 102-1 through 102-M, terminals 103-$i$-1 through 103-$i$-$N_i$ associated with each access point 102-$i$, remote terminals 104-1 through 104-P, controllers 105-1 through 105-Q, and mixers 106-1 through 106-R, interconnected as shown. M, $N_1 \ldots N_M$, P, Q, and R are positive integers. Teleconferencing system 100 is capable of handling one or more conference calls concurrently.

Telecommunications network 101 is a distribution system comprising switches and a backbone network that allows access points 102-1 through 102-M to communicate with each other via exchanging frames (also known as "packets"). As some examples, telecommunications network 101 can comprise the Public Switched Telephone Network (PSTN), or telecommunications network 101 can comprise a local or wide area network (e.g., within a building, encompassing multiple locations of a corporation, etc.). It will be clear to those skilled in the art how to make and use telecommunications network 101.

Access point 102-$i$, for $i=1$ to M, is used to distribute audio, control, and other signals to and from each participant in a conference call in a particular room or area. Access point 102-$i$ is described in detail later.

There can be more than one access point 102-$i$ per conference call for multiple reasons. First, access point 102-$i$ can communicate in accordance with the Bluetooth protocol or another wireless air interface protocol, in which case a limit might exist on the number of active participants that can be associated with a given access point at any given time. For example, Bluetooth has a limit of eight active terminals per access point. Therefore, more than one access point might be required within a given conference room or area.

Second, multiple conference rooms that are far apart from each other might be used during a particular conference call. At least one access point 102-$i$ is needed to support each conference room, so multiple access points are required to support a plurality of conference rooms.

Each access point 102-$i$ has one or more terminals associated with it. Terminal 103-$i$-$j$, for $i=1$ to M and $j=1$ to $N_i$, is a telecommunications device associated with a particular user who is already participating in a conference call or who is joining a conference call. The number of terminals associated with each access point 102-$i$ can be different across access points. In some embodiments, some or all of the terminals throughout teleconferencing system 100 can be headsets. Each participant in the conference room or area uses terminal 103-$i$-$j$ to hear the non-collocated participants and to talk to the non-collocated participants. The headsets can replace the speaker and microphone associated with a speakerphone, if all participants in the conference room use headsets. Terminal 103-$i$-$j$ is described in detail later.

Remote terminal 104-$i$, for $i=1$ to P, can be a conventional handset tied into the Public Switched Telephone Network or into a private branch exchange in a building. The audio signals exchanged between remote terminal 104-$i$ and terminal 103-$i$-$j$ are converted between different formats within telecommunications network 101, in some embodiments by mixer 106-$i$. It will be clear to those skilled in the art how to convert audio signals between different formats (e.g., T1 pulse-code modulation versus Bluetooth, etc.). It will also be clear to those skilled in the art how to make and use remote terminal 104-$i$.

Controller 105-$i$, for $i=1$ to Q, is used to manage the ongoing conference call. For example, controller 105-$i$ can manage the audio signals, notify the presence of participants, and allow other systems to both control and retrieve information during a meeting. Controller 105-$i$ can be accessed by one or more participants during the conference call, or alternatively by a conference call attendant, through a graphical user interface or a web-based interface. One or more controllers 105-1 through 105-Q are allocated based on the resource needs of one or more conference calls present in teleconferencing system 100.

In some embodiments, mixer 106-$i$, for $i=1$ to R, is present to specifically manage the content of each audio signal. One or more mixers 106-1 through 106-R are allocated based on the resource needs of one or more conference calls present in teleconferencing system 100. Mixer 106-$i$ is described in detail later.

Figure 2:
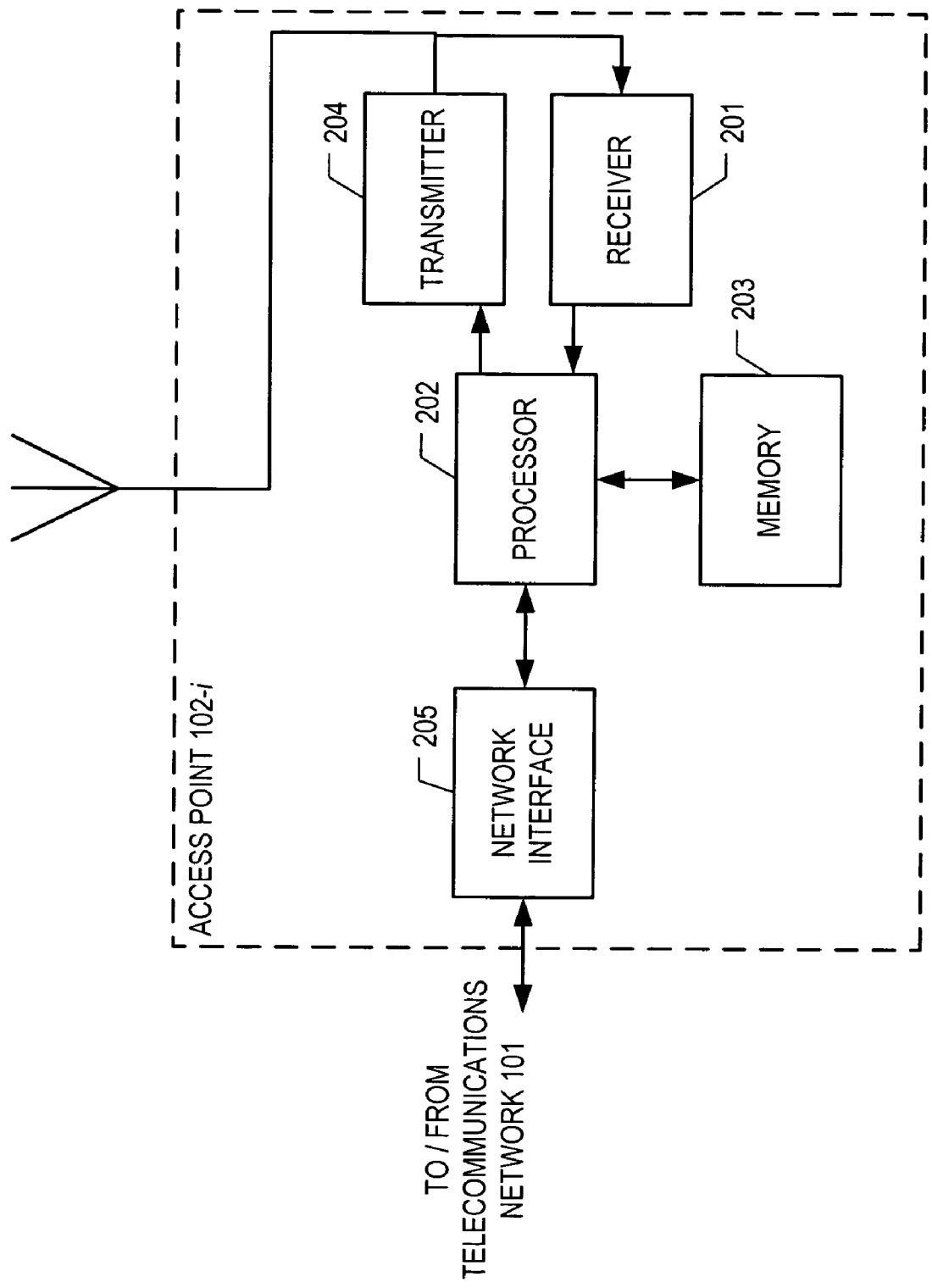
FIG. 2 depicts a block diagram of the salient components of access point 102-$i$ in accordance with the illustrative embodiment of the present invention.

FIG. 2 depicts a block diagram of the salient components of access point 102-$i$ in accordance with the illustrative embodiment of the present invention. Access point 102-$i$ comprises receiver 201, processor 202, memory 203, transmitter 204, and network interface 205, interconnected as shown.

Receiver 201 is a circuit that is capable of receiving frames from the shared communications channel, in well-known fashion, and of forwarding them to processor 202. The frames include both data frames (e.g., for conveying audio, etc.) and control frames (e.g., for conveying identifiers of terminals, etc.). It will be clear to those skilled in the art how to make and use receiver 201.

Processor 202 is a general-purpose processor that is capable of performing the tasks described below and with respect to FIGS. 6 and 7. It will be clear to those skilled in the art, after reading this specification, how to make and use processor 202.

Memory 203 is capable of storing programs and data used by processor 202. It will be clear to those skilled in the art how to make and use memory 203.

Transmitter 204 is a circuit that is capable of receiving frames from processor 202, in well-known fashion, and of transmitting them on the shared communications channel. It will be clear to those skilled in the art how to make and use transmitter 204.

Network interface 205 is a circuit that is capable of transmitting frames to telecommunications network 101 received from processor 202. Network interface 205 is also capable of receiving frames from telecommunications network 101 to send to processor 202. It will be clear to those skilled in the art how to make and use network interface 205.

Access point 102-$i$ can be a terminal with wireless capabilities and conferencing software, a computer with the ability to communicate in accordance with a specific air interface protocol, or a standalone access point connected to a wider network (e.g., telecommunications network 101, etc.). Access point 102-$i$ communicates over a shared communications channel with one or more terminals. Access point 102-$i$ can be associated with an internet protocol (IP) terminal, a modified Bluetooth-enabled phone, or a phone modified to operate in accordance with another wireless air interface protocol.

Figure 3:
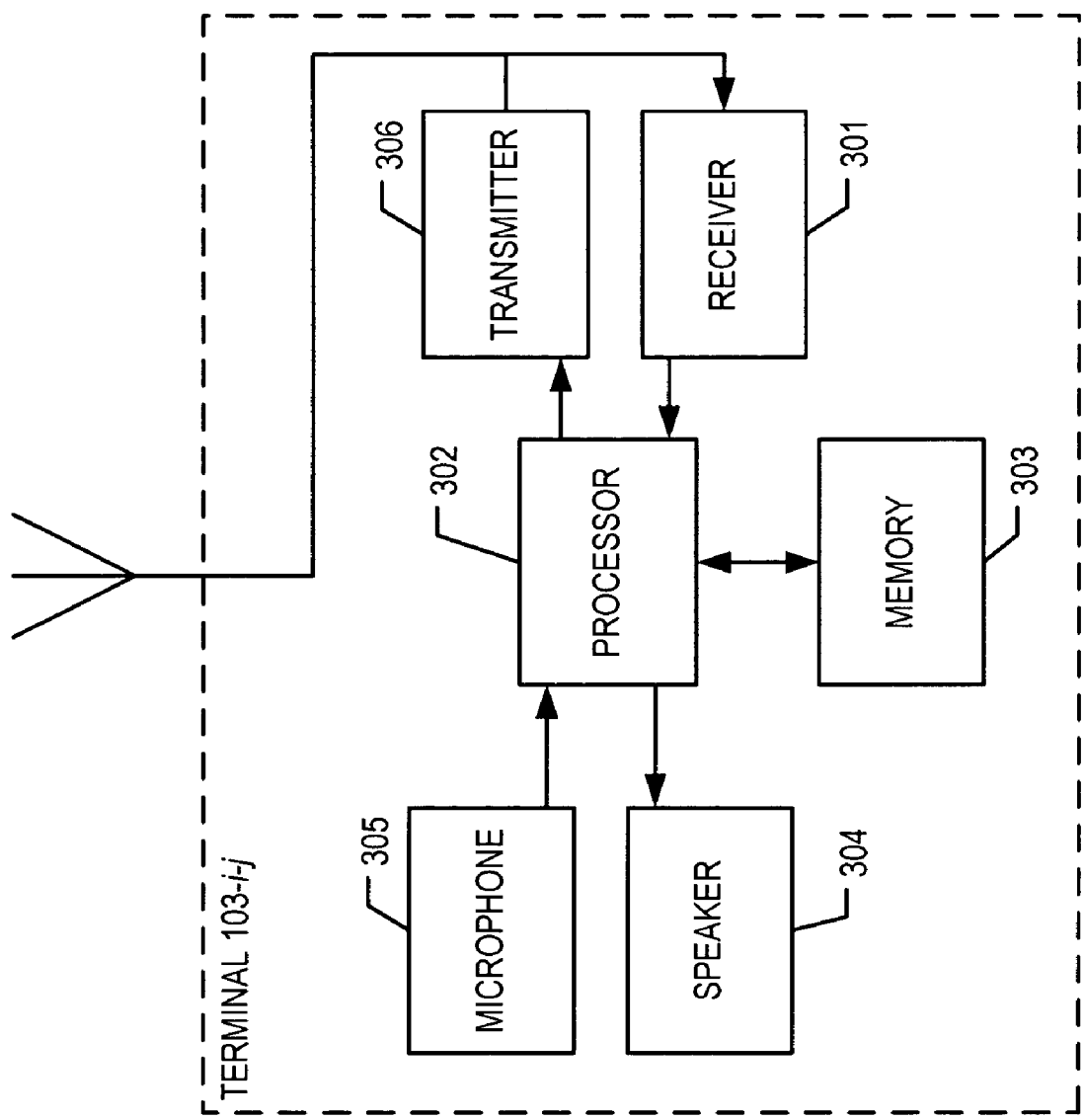
FIG. 3 depicts a block diagram of the salient components of terminal 103-$i$-$j$ in accordance with the illustrative embodiment of the present invention.

FIG. 3 depicts a block diagram of the salient components of terminal 103-$i$-$j$ in accordance with the illustrative embodiment of the present invention. Terminal 103-$i$-$j$ comprises receiver 301, processor 302, memory 303, speaker 304, microphone 305, and transmitter 306, interconnected as shown.

Receiver 301 is a circuit that is capable of receiving frames from the shared communications channel, in well-known fashion, and of forwarding them to processor 302. The frames include both data frames (e.g., for conveying audio, etc.) and control frames (e.g., for conveying distinctive tone information, etc.). It will be clear to those skilled in the art how to make and use receiver 301.

Processor 302 is a general-purpose processor that is capable of performing the tasks described below and with respect to FIGS. 6 and 7. It will be clear to those skilled in the art, after reading this specification, how to make and use processor 302.

Memory 303 is capable of storing programs and data used by processor 302. It will be clear to those skilled in the art how to make and use memory 303.

Speaker 304 is an electric-to-acoustic transducer that is capable of accepting electrical signals from processor 302 and converting those signals to audio signals that the user of terminal 103-$i$-$j$ can hear. It will be clear to those skilled in the art how to make and use speaker 304.

Microphone 305 is an acoustic-to-electric transducer that is capable of accepting audio signals from the user of terminal 103-$i$-$j$ and converting those signals to electrical signals sent to processor 302. It will be clear to those skilled in the art how to make and use microphone 305.

Transmitter 306 is a circuit that is capable of receiving frames (i.e., data and control frames) from processor 302, in well-known fashion, and of transmitting them on the shared communications channel. It will be clear to those skilled in the art how to make and use transmitter 306.

Terminal 103-$i$-$j$ has a unique identifier and this identifier can be associated with the user of terminal 103-$i$-$j$. Other wireless devices can also be associated with the user of terminal 103-$i$-$j$. This association can be used to capture and record the identities of the participants as each wireless device (e.g., terminal 103-$i$-$j$, etc.) makes its presence known.

Figure 4:
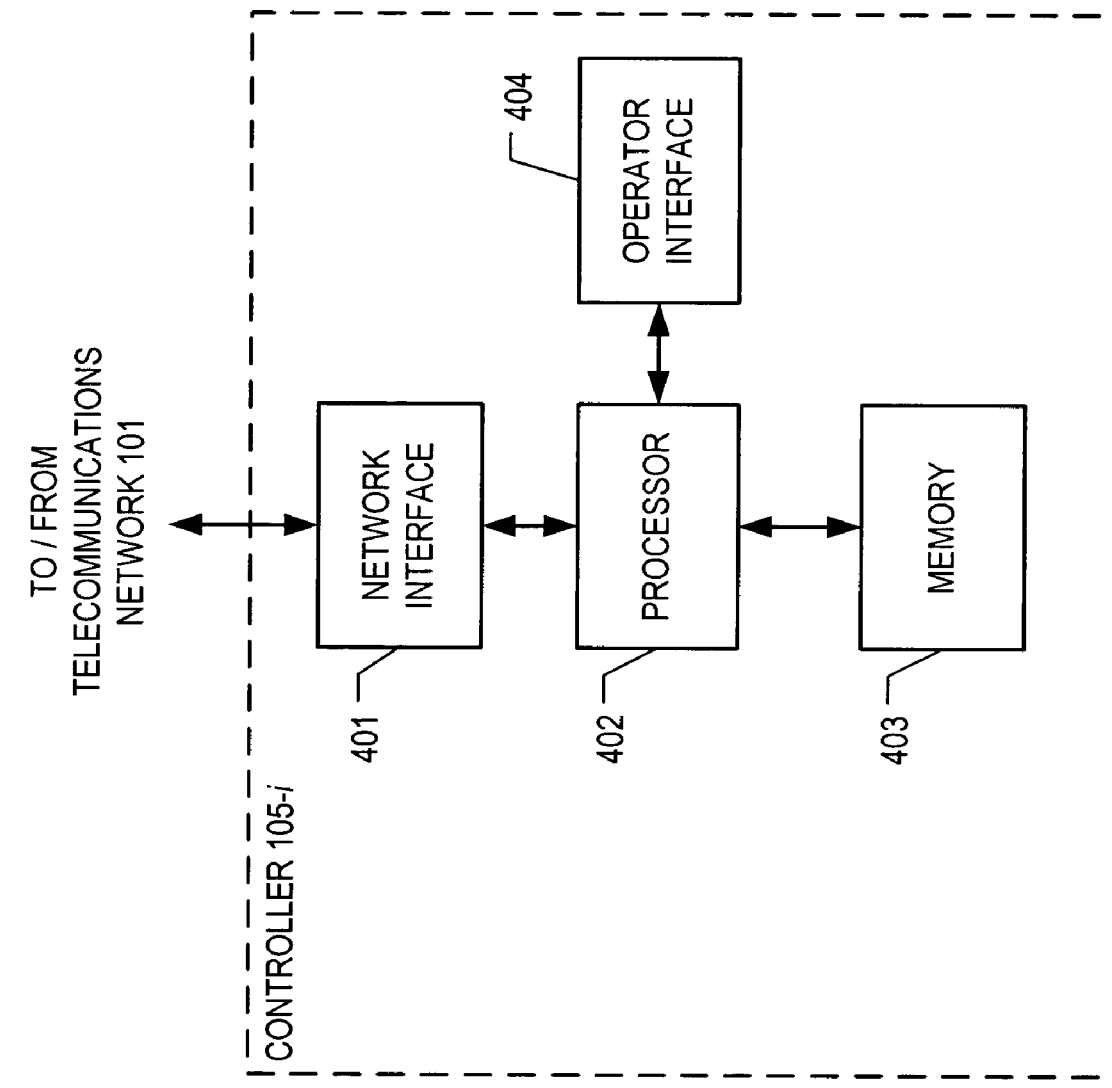
FIG. 4 depicts a block diagram of the salient components of controller 105-$i$ in accordance with the illustrative embodiment of the present invention.

FIG. 4 depicts a block diagram of the salient components of controller 105-$i$ in accordance with the illustrative embodiment of the present invention. Controller 105-$i$ comprises network interface 401, processor 402, memory 403, and operator interface 404, interconnected as shown.

Network interface 401 is a circuit that is capable of transmitting frames to telecommunications network 101 received from processor 402. Network interface 401 is also capable of receiving frames from telecommunications network 101 to send to processor 402. It will be clear to those skilled in the art how to make and use network interface 401.

Processor 402 is a general-purpose processor that is capable of performing the tasks described below and with respect to FIGS. 6 and 7. It will be clear to those skilled in the art, after reading this specification, how to make and use processor 402.

Memory 403 is capable of storing programs and data used by processor 402. It will be clear to those skilled in the art how to make and use memory 403.

Operator interface 404 is capable of accepting commands from an attendant or a conference call participant. Operator interface 404 is also capable of displaying information (e.g., status, etc.) and of representing that information to the attendant or participant. It will be clear to those skilled in the art how to make and use operator interface 404.

The participants or attendant or both can initiate calls on teleconferencing system 100 by using controller 105-$i$. As an example, a participant can initiate a call by using a companion device (e.g., a wireless tablet computer that is present in a conferencing area, etc.) and an interface tied to a personnel directory or some other database of people. An application program interface delivered through the Internet and wirelessly over a shared communications channel can serve as the means to initiate calls. Controller 105-$i$ can take the input transmitted from the companion device and map the input into dialing instructions that are understandable by switches present in telecommunications network 101.

Figure 5:
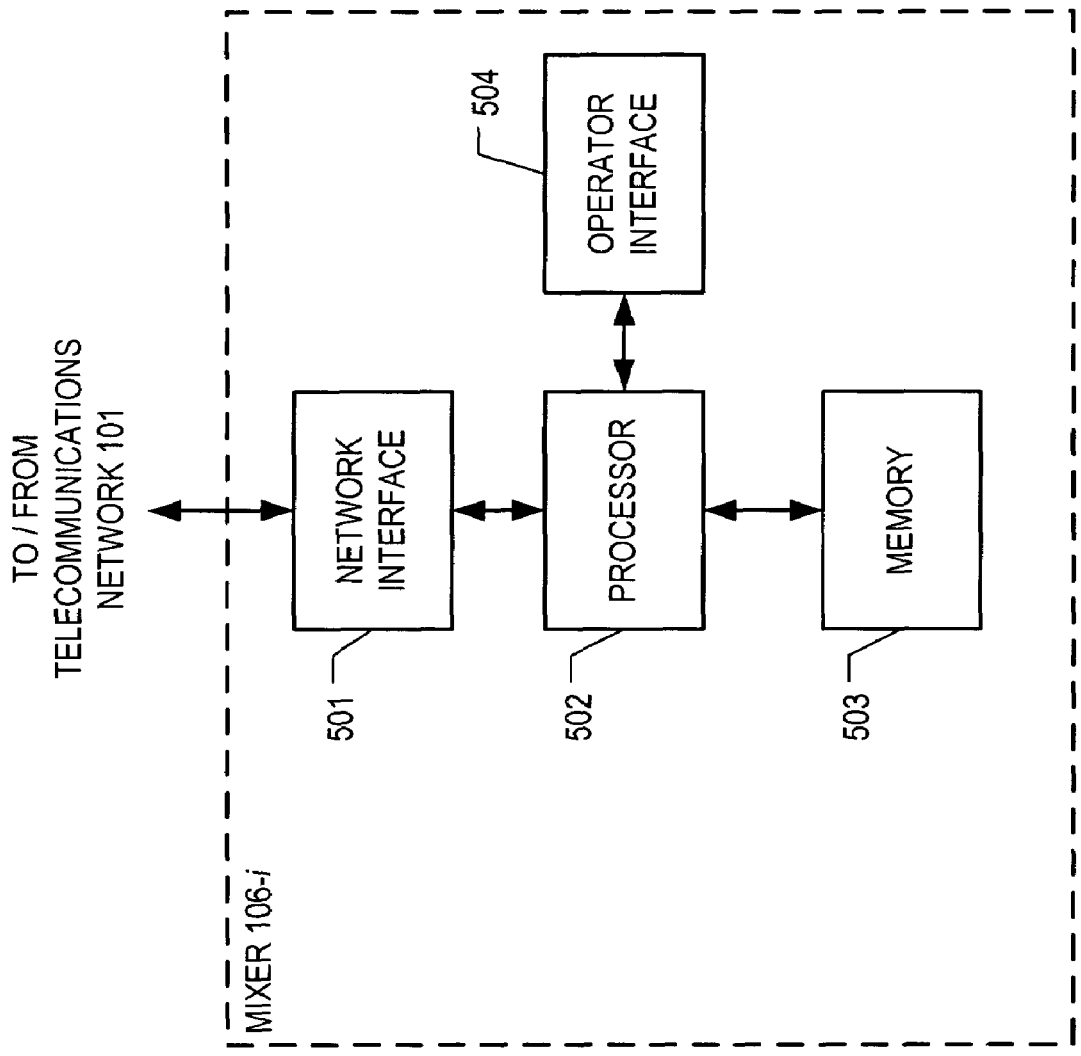
FIG. 5 depicts a block diagram of the salient components of mixer 106-$i$ in accordance with the illustrative embodiment of the present invention.

FIG. 5 depicts a block diagram of the salient components of mixer 106-$i$ in accordance with the illustrative embodiment of the present invention. Mixer 106-$i$ comprises network interface 501, processor 502, memory 503, and operator interface 504, interconnected as shown.

Network interface 501 is a circuit that is capable of transmitting frames received from processor 502 to telecommunications network 101. Network interface 501 is also capable of receiving frames from telecommunications network 101 to send to processor 502. It will be clear to those skilled in the art how to make and use network interface 501.

Processor 502 is a general-purpose processor that is capable of performing the tasks described below and with respect to FIGS. 6 and 7. It will be clear to those skilled in the art, after reading this specification, how to make and use processor 502.

Memory 503 is capable of storing programs and data used by processor 502. It will be clear to those skilled in the art how to make and use memory 503.

Operator interface 504 is capable of accepting commands from an attendant or a conference call participant. Operator interface 504 is also capable of displaying information (e.g., status, etc.) and of representing that information to the attendant or participant. It will be clear to those skilled in the art how to make and use operator interface 504.

Mixer 106-$i$ can be used to adjust volume levels of the various audio signals. An automatic gain control mechanism associated with mixer 106-$i$ can control the volume levels, each participant can adjust the volume of each speaking participant manually to a level that is correct for that listening participant, or another technique can control the volume.

Mixer 106-$i$ can create subconferences, sidebar conversations, and whispering effects. Examples of audio messages that can be bridged in include alerts and interruptions. Alternatively controller 105-$i$ can handle the functionality associated with mixer 106-$i$ or work in concert with mixer 106-$i$.

Figure 6:
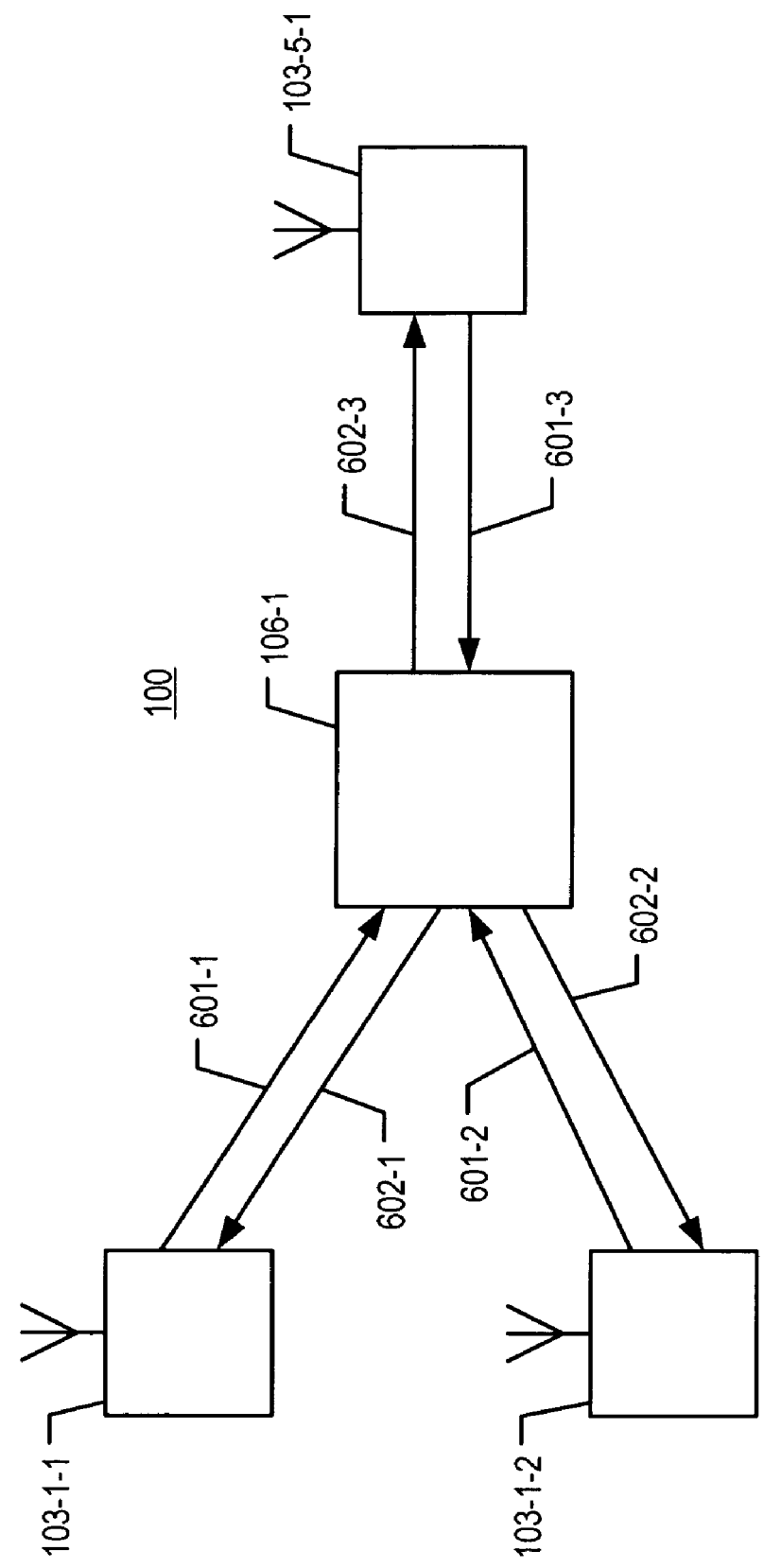
FIG. 6 depicts a block diagram an exemplary set of terminals with mixer 106-$i$ in accordance with the illustrative embodiment of the present invention.

FIG. 6 depicts an alternative block diagram of teleconferencing system 100, in which the interconnections between terminal 103-1-1, terminal 103-2-1, terminal 103-5-1, and mixer 106-1 are shown so as to highlight the streams of data (e.g., audio, etc.) flowing between each exemplary element depicted. Other elements present in teleconferencing system 100 are omitted from FIG. 6 to emphasize the flows between each exemplary element depicted. Terminals 103-1-1 and 103-2-1 are associated with conference call participants who are both present in a first conference room. Terminal 103-5-1 is associated with a conference call participant who is present in a second conference room.

In the example provided, terminal 103-1-1 transmits across path 601-1 a first series of frames that represents a first audio signal. The first audio signal represents the voice of the user of terminal 103-1-1. Terminal 103-1-2 transmits across path 601-2 a second series of frames that represents a second audio signal. The second audio signal represents the voice of the user of terminal 103-1-2. Terminal 103-5-1 transmits across path 601-3 a third series of frames that represents a third audio signal. The third audio signal represents the voice of the user of terminal 103-5-1.

Mixer 106-1 receives all three series of frames, as well as possibly other series of frames representing other audio signals. Furthermore, mixer 106-1 can receive control frames, either from the terminals depicted or from other sources (e.g., controller 105-$i$, etc.) throughout teleconferencing system 100.

Mixer 106-1 forms a fourth series of frames that represents a composite signal comprising at least one of the first audio signal, the second audio signal, and the third audio signal. Mixer 106-1 transmits the fourth series of frames across path 602-1. Terminal 103-1-1 receives the fourth series of frames.

Mixer 106-1 forms a fifth series of frames that represents a composite signal comprising at least one of the first audio signal, the second audio signal, and the third audio signal. Mixer 106-1 transmits the fifth series of frames across path 602-2. Terminal 103-1-2 receives the fifth series of frames.

Mixer 106-1 forms a sixth series of frames that represents a composite signal comprising at least one of the first audio signal, the second audio signal, and the third audio signal. Mixer 106-1 transmits the sixth series of frames across path 602-3. Terminal 103-5-1 receives the sixth series of frames.

Mixer 106-1 recognizes that terminal 103-1-1, terminal 103-1-2, and 103-5-1 are participating on the conference call because the three terminals transmit terminal identifiers to mixer 106-1. The identifiers can be sent when a terminal joins a call, sent periodically, sent in a control frame, sent as part of a data frame, or sent in other ways. The identifiers can be sent directly to mixer 106-1 or through another system (e.g., controller 105-*i*, etc.). It will be clear to those skilled in the art how to determine the participants involved in a conference call.

Furthermore, mixer 106-1 knows where the three exemplary terminals are located relative to each other for determining collocation status. Telecommunications system 100 can determine this by noting the access point through which a given terminal is participating on the conference call or through some other means. Telecommunications system 100 can provide the access point identifier, or equivalent, to mixer 106-1. In contrast, if a remote terminal, as an example remote terminal 104-1, joins the conference call, mixer 106-1 provides terminal 104-1 a composite signal comprising all of the audio signals from all of the other participants. Providing a composite signal is important because the collocation status of remote terminal 104-1, a conventional handset, might be indeterminate. Mixer 106-1 can decide to provide all of the audio signals, for example, when it does not receive the access point identifier, or equivalent.

A participant or attendant associated with a conference call can adjust the volume levels of the individual audio signals that are represented in a series of frames transmitted by mixer 106-1. For example, the user of terminal 103-1-1 can adjust the individual levels of the audio signals represented in the fourth series, which is being received by terminal 103-1-1. The user adjusts the levels by sending a command to mixer 106-1, either directly or through another system (e.g., controller 105-*i*, etc.).

Mixer 106-1 can select which input audio signals are included in the composite signal represented by an output series of frames (i.e., frames transmitted by mixer 106-1). For instance, since the users of terminals 103-1-1 and 103-1-2 are known to be in the same conference room and can hear each other without the use of headsets, the series of frames being provided to terminal 103-1-1 does not have to include the audio signal from terminal 103-1-2 or the audio signal from terminal 103-1-1 itself, for that matter. Mixer 106-1 only includes the audio signal from terminal 103-5-1 in what is transmitted to terminals 103-1-1 and 103-1-2, since the user of terminal 103-5-1 is in a separate conference area. In other words, the mixing of the audio signals into each output series of frames is dependent on the location of one source (e.g., terminal 103-1-1, etc.) with respect to the location of another source (e.g., terminal 103-1-2, terminal 103-5-1, etc.).

At the start of a conference call, the users of terminals 103-1-1 and terminals 103-1-2 are presumably waiting in a conference room for other participants to join on. When the user of terminal 103-5-1 joins the call, terminal 103-5-1 sends its terminal identifier (e.g., via a control frame, in the header of a data frame, etc.) to the network. Mixer 106-1 is then directed (e.g., by a controller, etc.) to mix an indication of the participant who joined the call into the composite audio signals being transmitted to terminals 103-1-1 and 103-1-2. The indication can at a whisper level of volume, and it can be in a different tone than the audio of the person speaking (e.g., female voice if a male is speaking, etc.).

When a user of a terminal begins to speak, the other users who are not collocated in the same area can receive information about the person speaking. For example, suppose that the user of terminal 103-1-1 begins to speak: either terminal 103-1-1 can transmit the start-of-speech event to mixer 106-1 or mixer 106-1 can detect the event. It will be clear to those skilled in the art how to recognize that there is voice activity at a particular terminal.

Mixer 106-1 determines which terminals are not collocated with respect to terminal 103-1-1 (in this case, terminal 103-5-1) and mixes in an audio signal containing information about the user of terminal 103-1-1 (e.g., the name of the person, etc.). The indication can at a whisper level of volume, and it can be in a different tone than the audio of the person speaking (e.g., female voice if a male is speaking, etc.).

When an outside party (i.e., a person that is not part of the conference call) wishes to interrupt a participant, the outside party can do so without interrupting the other participants. For example, suppose the user of terminal 103-1-2 has made prior arrangements with a secretary to have the secretary interrupt the user if a particular event occurs (e.g., an important person is waiting for the user, the secretary learns some news relevant to the conference call, etc.). The secretary can command mixer 106-1 to mix in an audio signal into the frames being received by terminal 103-1-2 to bridge in either a message to call the secretary or the actual information that the secretary wishes to convey to the user.

Figure 7:
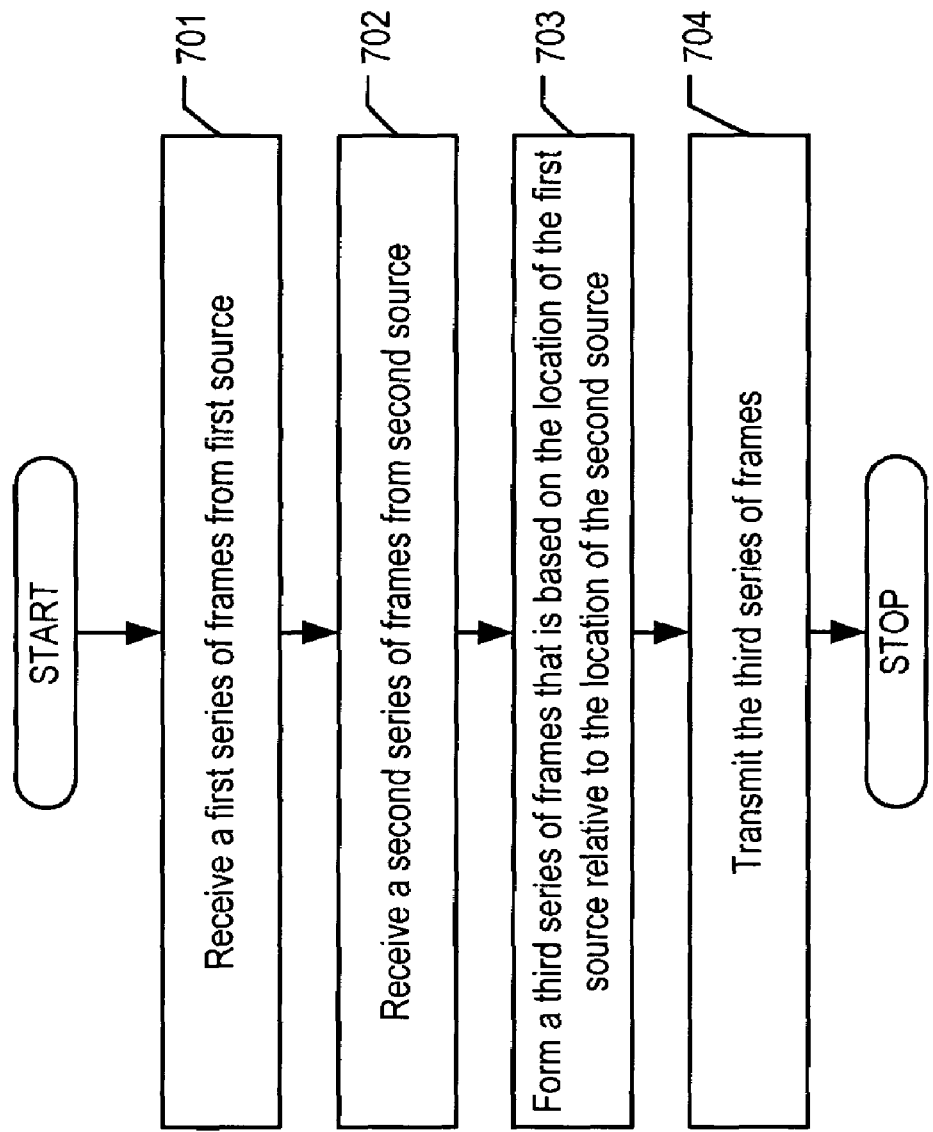
FIG. 7 depicts a flowchart of the illustrative embodiment of the present invention.

FIG. 7 depicts a flowchart of the salient tasks performed by the illustrative embodiment of the present invention. It will be clear to those skilled in the art which tasks depicted in FIG. 7 can be performed simultaneously or in a different order than that depicted.

At task 701, mixer 106-*i* receives a first series of frames that represents a first audio signal from a first source. The first source can be a wireless headset that communicates in accordance with the Bluetooth protocol or another air interface protocol through an access point.

At task 702, mixer 106-*i* receives a second series of frames that represents a second audio signal from a second source. The second source can be a wireless headset that communicates in accordance with the Bluetooth protocol or another air interface protocol through an access point.

At task 703, mixer 106-*i* forms a third series of frames that represents a composite comprising at least one of the first audio signal and the second audio signal. The composite is based on the location of the first source relative to the location of the second source. In some embodiments, the individual levels of the first audio signal and the second audio signal as represented in the third series of frames are adjustable remotely.

At task 704, mixer 106-*i* transmits the third series of frames.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   receiving:
   (1) a first series of frames that represents a first audio signal from a first user's terminal, said first user's terminal being a first headset, and
   (2) a second series of frames that represents a second audio signal from a second user's terminal;
   forming a third series of frames that represents a first composite signal that excludes said second audio signal when said first user's terminal and said second user's terminal are collocated with each other along a direct audio path; and
   transmitting said third series of frames to said first user's terminal.

2. The method of claim 1 further comprising:
   forming a fourth series of frames that represents a second composite signal that excludes said first audio signal when said first user's terminal and said second user's terminal are collocated with each other along said direct audio path, wherein said second user's terminal is a second headset; and transmitting said fourth series of frames to said second user's terminal.

3. The method of claim 1 further comprising tracking whether said first user's terminal and said second user's terminal are collocated with each other.

4. The method of claim 1 wherein said first user's terminal and said second user's terminal communicate in accordance with the Bluetooth protocol.

5. The method of claim 1 wherein the individual levels of said first audio signal and said second audio signal as represented in said third series of frames are adjustable remotely.

6. An apparatus comprising:
a network interface for:
 (1) receiving a first series of frames that represents a first audio signal from a first user's terminal and a second series of frames that represents a second audio signal from a second user's terminal, said first user's terminal being a first headset, and
 (2) transmitting a third series of frames to said first user's terminal; and
a processor for forming said third series of frames;
wherein said third series of frames represents a first composite signal that excludes said second audio signal when said first user's terminal and said second user's terminal are collocated with each other along a direct audio path.

7. The apparatus of claim 6 wherein said network interface is also for transmitting a fourth series of frames to said second user's terminal, wherein said second user's terminal is a second headset; and
wherein said processor is also for forming said fourth series of frames, wherein said fourth series of frames represents a second composite signal that excludes said first audio signal when said first user's terminal and said second user's terminal are collocated with each other along said direct audio path.

8. The method of claim 6 wherein said apparatus tracks whether said first user's terminal and said second user's terminal are collocated with each other.

9. The apparatus of claim 6 wherein said first user's terminal and said second user's terminal communicate in accordance with the Bluetooth protocol.

10. The apparatus of claim 6 wherein the individual levels of said first audio signal and said second audio signal as represented in said third series of frames are adjustable remotely.

11. The apparatus of claim 6 further comprising an access point for interconnecting said first user's terminal with said network interface.

12. A system comprising:
a mixer for:
 (1) receiving a first series of frames that represents a first audio signal from a first user's terminal and a second series of frames that represents a second audio signal from a second user's terminal;
 (2) forming a third series of frames that represents a first composite signal that excludes said second audio signal when said first user's terminal and said second user's terminal are collocated with each other along a direct audio path; and
 (3) transmitting said third series of frames to said first user's terminal;
said first user's terminal for:
 (1) transmitting said first series of frames; and
 (2) receiving said third series of frames; and
said second user's terminal for transmitting said second series of frames.

13. The system of claim 12 wherein said mixer is also for:
(2.1) forming a fourth series of frames that represents a second composite signal that excludes said first audio signal when said first user's terminal and said second user's terminal are collocated with each other along said direct audio path; and
(3.1) transmitting said fourth series of frames to said second user's terminal.

14. The method of claim 12 wherein said system tracks whether said first user's terminal and said second user's terminal are collocated with each other.

15. The system of claim 12 wherein said first user's terminal and said second user's terminal are wireless headsets that communicate in accordance with the Bluetooth protocol.

16. The system of claim 12 wherein the individual levels of said first audio signal and said second audio signal as represented in said third series of frames are adjustable remotely.

17. The system of claim 12 further comprising a controller for providing information about conference call participants and about the participant who is speaking.

* * * * *